United States Patent [19]

Friedlander et al.

[11] 4,130,708

[45] Dec. 19, 1978

[54] SILOXANE URETHANE ACRYLATE RADIATION CURABLE COMPOUNDS FOR USE IN COATING COMPOSITIONS

[75] Inventors: Charles B. Friedlander, Glenshaw; John C. McMullen, Pittsburgh, both of Pa.

[73] Assignee: PPG Industries, Inc., Pittsburgh, Pa.

[21] Appl. No.: 858,974

[22] Filed: Dec. 9, 1977

[51] Int. Cl.$^2$ .............................................. C08G 77/04
[52] U.S. Cl. .................................. 528/28; 204/159.13; 204/159.22; 204/159.23; 260/29.1 SB; 260/31.2 N; 260/31.8 S; 260/31.8 R; 260/448.2 N; 528/29; 528/33; 528/43; 528/44
[58] Field of Search .................... 260/2.5 BE, 2.5 AH, 260/77.5 AM, 46.5 E, 29.1 SB, 31.2 N, 31.8 S, 31.8R, 448.2 N; 204/159.23, 159.22, 159.13

[56] References Cited

U.S. PATENT DOCUMENTS

| 3,243,475 | 3/1966 | Reischl et al. | 260/77.5 AM |
| 3,399,247 | 8/1968 | Windemuth et al. | 260/77.5 AM |
| 4,033,912 | 7/1977 | Kleimann et al. | 260/2.5 AH |

*Primary Examiner*—Melvyn I. Marquis
*Attorney, Agent, or Firm*—J. Timothy Keane

[57] ABSTRACT

Radiation curable compounds are disclosed which are derived from the reaction of siloxy-containing carbinol, a polyisocyanate and a polyfunctional compound having hydroxy and acrylic functional groups. The compounds have high cure rates, are compatible with other components of radiation curable, film forming compositions and impart good slip and other properties to cured film coatings.

14 Claims, No Drawings

SILOXANE URETHANE ACRYLATE RADIATION CURABLE COMPOUNDS FOR USE IN COATING COMPOSITIONS

BACKGROUND OF THE INVENTION

1. Field of the Invention

Radiation sensitive compounds which polymerize rapidly are useful to form decorative or protective film coatings for a wide variety of substrates. Of particular interest are radiation curable compounds that impart good slip properties to compositions for forming protective films of high gloss for paper and paperboard substrates.

2. Description of the Prior Art

Silicon-containing compounds useful as slip-aid and flow-control agents in coating compositions are well known. For example, British Pat. No. 927,517 to Farbe Werke Hoechst A.G. discloses polydimethylsiloxanes as flow-control agents for paints and German Pat. No. 1,092,858 to Farbenfabricken Bayer discloses phenyl-substituted polysiloxanes as flow improvement agents for coating compositions. Typically, these conventional silicon-type lubricating agents are somewhat incompatible with other components of the coating compositions so that foaming can result when the compositions are applied to a substrate, especially where the silicone agent is present in amounts greater than about 2 percent by weight of the composition. The cured film thus may be pitted and have uneven gloss. Reduction in film integrity can also result because the silicone slip agents do not cure in the conventional sense inasmuch as there is usually no cross-linkable moiety present in the silicone compound. More often, the slip-aid agents are merely occluded in the film, typically at the surface layer. When the surface layer wears away, the film can lose to a substantial degree its slip characteristics.

Radiation sensitive coating compositions requiring good film slip properties are those typically used for forming protective films on paper and paperboard substrates, such as magazine covers and record jackets, which articles having cured films thereon must slide easily when stacked or unstacked by paper handling machinery. Also, compositions for this application must cure quickly and form abrasion resistant films. Moreover, the films must exhibit fairly high gloss. Conventional radiation curable compositions for use in the paper coating industry do not provide films having the combination of good slip, fast cure and abrasion resistance.

SUMMARY OF THE INVENTION

It has now been found that improved slip and other properties can be imparted to a protective film by including in the film forming composition radiation polymerizable compound comprising the reaction product of (a) at least one siloxy-containing polycarbinol compound;
(b) a polyisocyanate; and
(c) a polyfunctional compound having at least one functional group which is reactive with an isocyanato group of said polyisocyanate and which polyfunctional compound after reaction with said isocyanato group provides at least one ethylenic functional group in said reaction product.

The described reaction product in addition to providing improved "slip" properties to cured films has the additional advantage of curing at a very high rate so that the reaction product is compatible in use with other fast curing monomers, such as the amide acrylate monomers disclosed in U.S. application Ser. No. 821,856 filed Aug. 4, 1977 of G. W. Gruber et al. Also, coating compositions having relatively high concentrations of the slipaid agent of this invention may be applied to a substrate without the objectionable foaming tendencies found with conventional slip agents. Moreover, it has been found that a film formed from a composition having the described reaction product does not lose its slip properties upon wear of the film surface layer. It is believed that since the slip agent of the invention is reacted into the film by co-curing with the other monomer components that the slip agent is present throughout the film layer and thus the slip property is not decreased by wear of the film surface.

DESCRIPTION OF THE PREFERRED EMBODIMENTS

The reaction product derived from the three components may be characterized as a compound having a siloxy-group containing backbone on which at least one urethane moiety is formed at a reactive carbinol group position, which urethane moiety has at least one terminal ethylenic group typically provided by an acrylic functional group. The term "siloxy-containing" as used herein is intended to include compounds having at least one silicon-oxygen group that may have substituted groups as defined below in detail. "Siloxy-containing" is thus intended to include compounds having one or more siloxane groups, that is, a group having alternating silicon and oxygen atoms, such as an

group. The compounds of the invention more typically are comprised of siloxane groups.

A useful siloxane-urethane-acrylate compound of the invention may be monomeric or oligomeric in character. For example, the simplest reaction product could comprise a single siloxane group having one urethane moiety to which is attached an acrylate group. Or, a polysiloxane may have attached one or more urethane moieties to each of several carbinol positions, each of which may have one or more acrylate groups.

A class of siloxy-containing polycarbinol compounds useful for forming the reaction product of the invention may be represented by the general formula

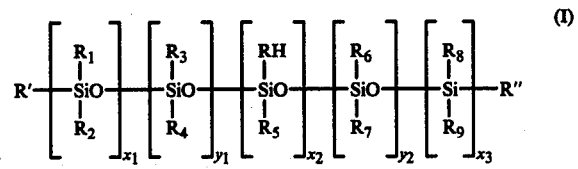

where R', R", $R_1$, $R_2$, $R_3$, $R_4$, $R_5$, $R_6$, $R_7$, $R_8$ and $R_9$ may each independently be alkyl groups of one to six carbon atoms or substituted derivatives thereof, where the substituted groups may be halogen, amine, aliphatic ether, cycloalkyl, cycloalkyl ethers, alkyloxy, aryl and arylalkoxy; also any of the aforementioned R', R" and $R_1$ through $R_9$ may be RH where R is defined as a bivalent oxalkylene group that with hydrogen on the oxygen atom of the group and the carbyl portion of the group attached to the silicon atom provides a reactive carbinol, where R may be

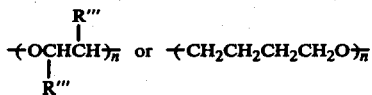

where R''' is hydrogen, halogen, alkyl of one to six carbon atoms, aryl, or the substituted derivatives thereof, with n = 1 to about 100. The formula is further characterized in that $x_1$ may be one to about 100, $x_2$ may be zero to about 4, $x_3$ is zero or one, $y_1$ may be zero to about 100, and $y_2$ may be zero to about 100. In a selection of a particular combination of the above specified factors in defining a structure covering a usable polycarbinol compound, the polycarbinol must contain at least two hydroxyl groups per molecule; these hydroxyl groups may be terminally positioned or positioned along the siloxane backbone.

Preferred polycarbinol compounds will have an average of two to three hydroxyl groups per molecule and average molecular weights in the range of about 800 to about 6,000. One particularly suitable class of polycarbinols is defined by formula I where R' = $R_1=R_2=R_3=R_4=R_5=R_8=R_9=R''=$ —$CH_3$; $x_1 = x_3=1$; $x_2 = 3$; $y_1$ has an average value of 74.1; $y_2 = O$ and R is

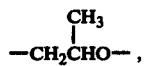

with the carbyl portion of the group attached to the silicon atom. The average molecular weight of a compound of the class is about 6000.

A second particularly suitable class of polycarbinols is defined by formula I where R' = $R_1=R_2=R_3=R_4=R_5=R_8=R_9=R''=$ —$CH_3$; $x_1 = x_3=1$; $x_2 = 3$; $y_1$ has an average value of 26.2; $y_2 = O$ and R is —$CH_2CH_2O$—, with the carbyl portion of the group attached to the silicon atom. The average molecular weight of a compound of the class is about 2400.

A third particularly suitable class of polycarbinols is defined by formula I where R' = $R_1=R_2=R_3=R_4=R_5=R_8=R_9=R''=$ —$CH_3$; $x_1 = x_3=1$; $x_2 = 2$; $y_1$ has an average value of 5.6; $y_2 = O$ and R is

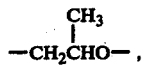

with the carbyl portion of the group attached to the silicon atom. The average molecular weight of a compound of the class is about 800.

The aforementioned particularly suitable siloxy-containing polycarbinol compounds, and similar polycarbinols that would likely work well in the invention, may be defined by formula II, which is a contracted version of general formula I:

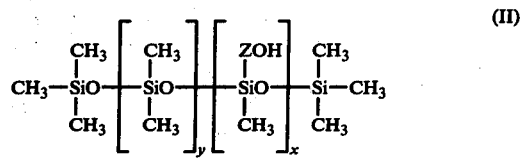

The compounds of formula II may be characterized as a class of polydimethylsiloxanes where a hydroxyl functional group is substituted on at least two of the repeating siloxy units of the backbone. The aforementioned particularly suitable polycarbinols would in the condensed formula II have, respectively, average typical values of y = 74.1, 26.2 and 5.6, with x = 3, 3 and 2; Z may be alkylene groups such as ethylene, 1,2-propylene, 1,4-butylene and the like. Suitable polysiloxane carbinols of the type described are sold under the trade designations "Dow Corning ® brand fluids Nos. Q4-3557, Q2-8026, 193 and 1248".

Another particularly suitable class of siloxy-containing polycarbinol compounds is defined by formula I where $R_1=R_2=R_3=R_4=R_8=R_9=$ -$CH_3$; $x_1 = x_3=1$; $y_2 = 0$; $y_1$ has an average value of 29.4 and R' = R''=R, where R is —$CH_2CH_2O$—, with the carbyl portion of the group attached to the silicon atom. The average molecular weight of a compound of the class is about 2400. Formula III, a condensed version of general formula I, depicts a class of polydimethylsiloxanes having terminal hydroxy groups:

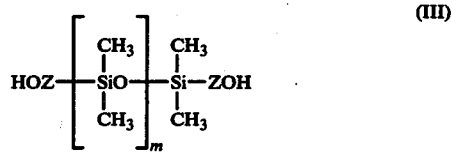

where m has an average value of about 29 and Z may be an alkylene group such as ethylene, 1,2-propylene, 1,4-butylene and the like. A suitable polysiloxane carbinol of the type described is sold under the trade designation "Dow Corning ® brand fluid No. Q4-3667".

It is to be understood that the illustrated formulae I, II and III are intended to be schematic in character and that the siloxy blocks could be randomly disposed along the backbone.

The polyisocyanate compounds useful for making the reaction product of the invention include ethylene diisocyanate, 1,2-diisocyanatopropane, 1,3-diisocyanatopropane, 1,6-diisocyanatohexane, 1,2-diisocyanatocyclohexane, 1,3-diisocyanatocyclohexane, 1,4-diisocyanatocyclohexane, o-diisocyanatobenzene, m-diisocyanatobenzene, p-diisocyanatobenzene, bis(4-isocyanatocyclohexyl)methane, bis(4-isocyanatophenyl)methane, toluene diisocyanate, 3,3'-dichloro-4,4'-diisocyanatobiphenyl, tris(4-isocyanatophenyl)methane, 1,5-diisocyanatonaphthalene, hydrogenated toluene diisocyanate, 1-isocyanatomethyl-5-isocyanato-1,3,3-trimethylcyclohexane, and 1,3,5-tris(6-isocyanatohexyl)biuret. Also included are polyisocyanates in a blocked form such as phenyl-blocked toluene diisocyanate and phenyl-blocked diisocyanatonaphthalene.

The third component for making the reaction product of the invention is a polyfunctional compound having at least one functional group which is reactive with an isocyanato group of the aforementioned polyisocyanate compound. It is further required that the polyfunctional compound after reaction with the isocyanato group provide at least one ethylenic functional group in the reaction product. Usually, the functional group of the polyfunctional compound reactive with the isocyanato group is a hydroxyl group, while the ethylenic group is furnished by an acrylate moiety. Suitable hydroxy-containing acrylate compounds include 2-hydroxyethyl acrylate, 2-hydroxypropyl acrylate, 3-hydroxypropyl acrylate, 2-hydroxyethyl methacrylate, 2-hydroxypropyl methacrylate, 3-hydroxypropyl methacrylate and the like.

The reaction product of the invention may be generally prepared by mixing together one or more of each of the aforementioned three components and allowing the mixture to react for a period of time sufficient to form the reaction product. Thus, the reaction product may be formed by mixing together and reacting siloxy-containing polycarbinol, a polyisocyanate and a hydroxy-containing acrylate compound. Or, the polycarbinol and a polyisocyanate may be reacted to form a siloxane-urethane intermediate having at least one terminal isocyanato group; then the intermediate is reacted with the hydroxy acrylate compound. Or, the polyisocyanate may be reacted with the hydroxyacrylate to form a urethane-acrylate intermediate containing at least one terminal isocyanato group; then the intermediate is reacted with a siloxy-containing polycarbinol to form the reaction product. Preferably, the reaction product is formed by adding a polyisocyanate to a mixture of a siloxy-containing polycarbinol and a hydroxy-acrylate. It is most preferred that the polyisocyanate be added gradually to the polycarbinol and hydroxy-acrylate mixture.

Whether all the components are mixed together at once or the components are added together to form intermediates, the equivalent weight ratios of siloxy-containing polycarbinol to polyisocyanate to polyfunctional compound is generally in the range of 1:1.25:0.25 to 1:2:1, and more usually the range of equivalent weight ratios is 1:1.5:0.65 to 1:2:1, although significantly lower amounts of the NCO-containing component may be used. An excess of the polyfunctional component is not at all harmful inasmuch as this component, especially when it is one of the aforementioned hydroxy-acrylate compounds, constitutes a reactive diluent for the reaction product.

The reaction product is generally used as an additive to coating compositions containing other radiation polymerizable components. Typical of these are polyester, polyurethane and polyamide materials having ethylenically unsaturated groups capable of undergoing addition polymerization in the presence of actinic light or ionizing radiation. The reaction product of the invention is particularly compatible with the class of radiation polymerizable amide acrylate compounds disclosed in the aforementioned U.S. application Ser. No. 821,856 and also with the radiation curable compositions disclosed in U.S. application Ser. No. 839,686, filed Oct. 5, 1977 of B. M. Humke et al., which compositions are particularly useful for paper coating.

When the slip-aid agents of the invention are used in coating compositions, the agents may be present in an amount from about 0.1 percent to about 90 percent by weight of the total composition. More often the agents are present in a range of about 1 to 10 percent. A coating composition may contain only the reaction product in a diluent, although other components are usually present. The diluent may be of the volatile, non-reactive type like toluene, xylene or methylene chloride, but is preferred to be of the substantially non-volatile, reactive type such as the classes of compounds of monoacrylate and methacrylate esters, diacrylates, acrylamides and heterocyclic vinyl compounds such as N-vinyl pyrrolidone. When the reaction product and a reactive diluent make up the composition, the diluent is usually present in an amount in the range of about 10 to 60 total weight percent, and preferably in the range of about 10 to 20 weight percent.

When the coating composition is to be cured by exposure to ultraviolet light, photoinitiator, photosensitizer or a mixture of photoinitiator and photosensitizer is usually present.

Photoinitiators are compounds which absorb photons and thereby obtain energy to form radical pairs, at least one of which is available to initiate addition polymerization of acrylic or methacrylic groups in the well-known manner. Photosensitizers are compounds which are good absorbers of photons, but which are themselves poor photoinitiators. They absorb photons to produce excited molecules which then interact with a second compound to produce free radicals suitable for initiation of addition polymerization. The second compound may be a monomer, a polymer or an added initiator. Examples of photoinitiators are benzoin, methyl benzoin ether, butyl benzoin ether, isobutyl benzoin ether, $\alpha,\alpha$-diethoxyacetophenone and $\alpha$-chloroacetophenone. Examples of photosensitizers are benzil, 1-naphthaldehyde, anthraquinone, benzophenone, 3-methoxybenzophenone, benzaldehyde, diethoxyacetophenone and anthrone.

The amount of photoinitiator, photosensitizer or mixture of photoinitiator and photosensitizer present in the radiation curable coating composition can vary widely. When any of these materials are present, the amount is usually in the range of from about 0.01 to about 10 percent by weight of the binder of the coating composition. Most often the amount is in the range of from about 0.1 to about 5 percent by weight of the binder. When the coating is to be cured by exposure to ionizing radiation, these materials are usually omitted from the coating composition, although their presence is permissible.

Extender pigments may be present in the composition, and when ultraviolet light is used to cure the film, it is preferred that the extender pigment be substantially transparent to ultraviolet light. Examples of ultraviolet light transparent extender pigments are silica, calcium carbonate, barium sulfate, talc, aluminum silicates, sodium aluminum silicates and potassium aluminum silicates.

Hiding and/or coloring pigment may optionally be present. When the pigment is of the ultraviolet light absorbing type and the coating composition is to be cured by exposure to ultraviolet light, the pigment should be used in amounts which do not preclude curing of the interior of the coating. Examples of hiding pigments are titanium dioxide, antimony oxide, zirconium oxide, zinc sulfide and lithopone. Examples of coloring pigments are iron oxides, cadmium sulfide, carbon black, phthalocyanine blue, phthalocyanine green, indanthrone blue, ultramarine blue, chromium oxide, burnt umber, benzidine yellow, toluidine red and aluminum powder. Individual pigments or mixtures of hiding and/or coloring pigments may be used.

Mixtures of extender pigments, hiding pigments and/or coloring pigments may also be employed.

Dyes in their customarily used amounts may be present in the coating composition.

Although not ordinarily desired, minor amounts, usually in the range of from about 0.1 to about 20 percent by weight of the vehicle, of volatile reactive solvent and/or inert volatile organic solvent may be present in the radiation curable coating composition.

Various additional materials may be added to adjust the viscosity of the coating composition. Examples of such materials are fumed silica, castor oil based compositions (e.g., Thixatrol ST, Baker Castor Oil Company), modified clays, 12-hydroxystearic acid, tetrabutyl orthotitanate and microcrystalline cellulose. When used, these materials are usually present in an amount in the range of from about 0.5 percent to about 15 percent by weight of the binder.

The radiation curable coating compositions of the invention are usually prepared by simply admixing the solution of the reaction product dissolved in reactive solvent with such other ingredients as may be present. Although mixing is usually accomplished at room temperature, elevated temperatures are sometimes used. The maximum temperature which is usable depends upon the heat stability of the ingredients. Temperatures above about 120° C. are only rarely employed.

The radiation curable coating compositions are used to form cured adherent coatings on substrates. The substrate is coated with the coating composition using substantially any technique known to the art. These include spraying, curtain coating, dipping, direct roll coating, reverse roll coating, painting, brushing, printing, drawing and extrusion. The coated substrate is then exposed to radiation of sufficient intensity for a time sufficient to crosslink the coating. The times of exposure to radiation and the intensity of the radiation to which the coating composition is exposed may vary greatly. Generally, the exposure to radiation should continue until the C-stage is reached when hard, solvent resistant films result. In certain applications, however, it may be desirable for the curing to continue only until the B-stage, viz., gel stage, has been obtained.

Substrates which may be coated with the compositions of this invention may vary widely in their properties. Organic substrates such as wood, fiberboard, particle board, composition board, paper, paper board, cardboard and various polymers such as polyesters, polyamides, cured phenolic resins, cured aminoplasts, acrylics, polyurethanes and rubber may be used. Inorganic substrates are exemplified by glass, quartz and ceramic materials. Many metallic substrates may be coated. Exemplary metallic substrates are iron, steel, stainless steel, copper, brass, bronze, aluminum, magnesium, titanium, nickel, chromium, zinc and alloys. Especially suitable substrates, in addition to the aforementioned paper and paper board substrates, are those adapted for use as floor coverings such as tile, asbestos-tile, or linoleum-like coverings. Useful substrates are made from or comprise vinyl-containing polymerizable compositions such as vinyl chloride, vinyl acetate, vinyl fluoride, vinylidene chloride and copolymerizable combinations of said vinyl-containing compounds with ethylene or propylene.

Cured coatings of the radiation curable coating composition usually have thicknesses in the range of from about 0.001 millimeter to about 3 millimeters. More often they have thicknesses in the range of from about 0.002 millimeter to about 0.3 millimeter, and most preferred are coatings ranging from 0.002 millimeter to 0.08 millimeter. When the radiation curable coating composition is a radiation curable printing ink, the cured coatings usually have thicknesses in the range of from about 0.001 millimeter to about 0.03 millimeter.

The coatings of this invention may be cured by exposure to ionizing radiation, the unit of dose of ionizing radiation being the "rad" which is equal to 100 ergs of energy absorbed from ionizing radiation per gram of material being irradiated. As used throughout the specification, dose is referenced to the bleaching of calibrated blue cellophane film irrespective of the identity of the coating composition being irradiated.

The coatings of the invention may also be cured by exposure to actinic light. Actinic light, as used herein, is electromagnetic radiation having a wavelength of 700 nanometers or less which is capable of producing, either directly or indirectly, free radicals capable of initiating addition polymerization of the coating compositions of the invention. Usually photoinitiator, photosensitizer or mixtures of photoinitiator and photosensitizer are present to absorb photons and produce the free radicals, although in some cases, these materials are not needed. Actinic light possesses insufficient energy to produce ions in a medium composed of common elements such as air or water and hence, has an energy below about 10 electron volts. The most commonly used form of actinic light is ultraviolet light, viz., electromagnetic radiation having a wavelength in the range of from about 180 nanometers to about 400 nanometers, although actinic light of greater or shorter wavelength may also be used effectively.

Any suitable source which emits ultraviolet light may be used in the practice of this invention. Suitable sources are set forth in U.S. Pat. No. 4,017,652 to G. W. Gruber.

The times of exposure to actinic light and the intensity of actinic light to which the coating composition is exposed may vary greatly. In keeping with the general principles heretofore set forth, the exposure to actinic light should usually continue until the C-stage is obtained. However, for certain applications, the exposure may be stopped when the B-stage has been achieved.

The following examples, setting forth specific reactant quantities and conditions, specify certain additives, such as catalysts, diluents and surfactants for preparation of the siloxane urethane acrylate compounds of the present invention. Unless otherwise indicated, all parts and percentages are by weight, and all viscosity values are from measurements of undiluted samples on the Gardner-Holt viscosity scale. These embodiments are not to be construed, however, as limiting the invention since there are numerous variations and modifications possible.

EXAMPLE I

A reaction vessel equipped with an agitator, a heater, cooling means, a reflux condenser and a thermometer is charged with 745 parts isophorone diisocyanate (namely, 1-isocyanatomethyl-5-isocyanato-1,3,3-trimethylcyclohexane), 908 parts triethylene glycol diacrylate and 2 parts dibutyltin dilaurate ("Niax" catalyst; Union Carbide Corporation). With the apparatus set for total reflux, the mixture is heated to about 40° C. in approximately 40 minutes under a nitrogen blanket with an air sparge applied below the mixture surface. Over a period of about two hours with the temperature of the reaction mixture maintained at 39°–42° C., there is added 1344 parts of a silicon-containing polycarbinol of the type illustrated in Formula II having an average hydroxyl equivalent weight of 400 and an average molecular weight of about 800 (Dow Corning ® Q4-3557). The temperature of the reaction mixture is then increased to about 49° C. in 20 minutes and maintained at that temperature for one hour. Then over a period of 30 minutes, a mixture of 627 parts 2-hydroxyethyl acrylate and 7 parts di-t-butyl-p-cresol ("Ionol" inhibiting agent; Shell Oil Co.) is added to the reaction vessel, with the temperature on the reaction mixture being held at 48°–49° C. The temperature of the reaction mixture is then maintained at about 49° C. for approximately three hours, after which time a Gardner-Holt viscosity measurement of "L" is obtained for an undiluted sample of the reaction mixture. The reaction mixture is then heated to about 66° C. for approximately two hours, after which time a viscosity of $T^-$ is obtained. The mixture is then cooled to about 52° C. and filtered through double nylon bags into storage containers. The product is observed to have a viscosity of $T^+$ and be clear in color.

EXAMPLE II

A reaction vessel equipped as in Example I is charged with 1426 parts isophorone diisocyanate, 1616 parts triethylene glycol diacrylate and 1.3 parts dibutyltin dilaurate. With the apparatus set for total reflux and with agitation of the reaction mixture, there is added to the reaction vessel over a period of 30 minutes 5130 parts of a silicon-containing polycarbinol of the type illustrated in Formula II having an average hydroxyl equivalent weight of 800 and an average molecular weight of 2400 (Dow Corning ® DC 193 fluid). Then the reaction mixture is heated from an initial temperature of about 29° C. to about 49° C. and maintained at 49°–52° C. for 45 minutes. Thereafter, a mixture of 990 parts 2-hydroxyethyl acrylate and 9.5 parts di-t-butyl-p-cresol is added to the reaction vessel over a period of 20 minutes with the temperature of the reaction mixture being maintained at 52°–54° C. Then as a rinse, 91 parts 2-hydroxyethyl acrylate is added to the reaction mixture. A Gardner-Holt viscosity value of $P^+$ is obtained on an undiluted sample of the reaction mixture, with a value of $V^-$ being obtained after 50 minutes with the temperature being maintained at 54°–61° C. Then the reaction mixture is heated to about 68° C. over a one-hour period and 182 parts more 2-hydroxyethyl acrylate is added quickly to the reaction vessel. After a 1 hour and 45 minute holding period and with the temperature of the reaction mixture maintained at 76°–77° C., a viscosity measurement of I was obtained on a sample consisting of 75 percent reaction mixture and 25 percent ethyl cellosolve. Then 45 parts 2-hydroxyethyl acrylate is added to the reaction mixture which is held at 74°–77° C. for one hour. Then after an additional one hour and 15 minutes with the reaction mixture cooled to about 71° C., 45 parts 2-hydroxyethyl acrylate is added to the reaction mixture, with the temperature thereafter maintained at 71°–74° C. for two hours and 30 minutes. The reaction mixture, cooled to about 52° C. and filtered through a nylon bag into storage containers, has a viscosity value of $Z3^+$ and is clear in color.

EXAMPLE III

A reaction vessel equipped similarly as that of Example I is charged with 74 parts isophorone diisocyanate, 198 parts triethyleneglycol diacrylate and 0.1 part dibutyltin dilaurate. With the temperature of the reaction mixture at about 40° C., there is added 667 parts of a silicon-containing polycarbinol of the type illustrated in Formula II having an average hydroxyl equivalent weight of 2000 and an average molecular weight of 6000 (Dow Corning ® 1248 fluid). With the temperature of the reaction mixture at about 50° C. after two hours and 15 minutes, the mixture is heated to about 65° C. in 20 minutes and then held at 65°–70° C. for 1 hour. Then a mixture of 51 parts 2-hydroxyethyl acrylate and 2 parts di-t-butyl-p-cresol is added to the reaction mixture which is then held at 70°–75° C. for 2 hours and 10 minutes. The reaction product is observed to have a viscosity of V on an undiluted sample and to be clear in color.

EXAMPLE IV

A reaction vessel equipped similarly as in that of Example I is charged with 55.5 parts isophorone diisocyanate, 130 parts triethyleneglycol diacrylate and 0.1 part dibutyltin dilaurate. With the reaction mixture initially at about 26° C., 300 parts of a silicon-containing polycarbinol of the type illustrated in Formula III having an average hydroxyl equivalent weight of 1,200 and an average molecular weight of 2400 (Dow Corning ® Q4-3667 fluid) is added dropwise to the reaction mixture over a period of 30 minutes, after which time the temperature of the mixture is about 40° C. Then the reaction mixture is heated to about 60° C. in 10 minutes and thereafter held at about 60° C. for one hour and 30 minutes. The reaction mixture is then allowed to cool and stand for about 16 hours. Then the reaction mixture is heated to about 65° C. and after one hour and 30 minutes a mixture of 35 parts 2-hydroxyethyl acrylate and 1 part di-t-butyl-p-cresol is added to the reaction vessel. The reaction mixture is then maintained at about 70° C. for three hours, after which time the mixture is cooled and placed in storage containers. The reaction product is observed to have a viscosity of $F^-$, for a sample consisting of 75 percent reaction product and 25 percent ethyl cellosolve, and to be clear in color.

EXAMPLE V

A reaction vessel equipped similarly as that of Example I is charged with 111 parts isophorone diisocyanate, 126 parts triethyleneglycol diacrylate, 0.1 part dibutyltin dilaurate and 400 parts of a silicon-containing polycarbinol of the type illustrated in Formula II having an average hydroxyl equivalent weight of 800 and an average molecular weight of 2400 (Dow Corning ® Q2-8026 fluid). The compounds are mixed for 45 minutes at a temperature of 45°–50° C. Then a mixture of 69.6 parts 2-hydroxyethyl acrylate and 1 part di-t-butyl-p-cresol is added to the reaction mixture, which is thereafter held at about 50° C. for two hours and 45 minutes. A viscosity of $X^{+\frac{1}{2}}$ is obtained for an undiluted sample. Then the reaction mixture is heated to about 65° C. and 10 parts 2-hydroxyethyl acrylate is added. After one hour and 30 minutes, 29 parts more of 2-hydroxyethyl acrylate is added to the reaction mixture which is then maintained at about 60° C. for 45 minutes and thereafter is allowed to cool and stand for about 17 hours. Then the reaction mixture is heated to 80° C. and maintained at that temperature for 1 hour. The reaction product is observed to have a viscosity of Z4 for an undiluted sample and to be clear in color.

EXAMPLE VI

A reaction vessel is equipped with an agitator, a heater, cooling means, a thermometer and a condensing apparatus. The vessel is charged with 842 parts diethanolamine and 159 parts toluene. With the contents of the vessel at an initial temperature of about 33° C. and under constant agitation, 383 parts 97 percent formic acid are added to the vessel over a period of about 30 minutes, after which time the temperature is about 94° C. Heating is continued under reflux conditions for about three hours, during which time about 132 parts water of reaction is collected as the temperature rises to about 138° C. The reaction mixture is then cooled to about 66° C. over a period of 30 minutes. The vessel is then charged with 534 parts 1,1,1-trimethylolpropane, 1797 parts acrylic acid, 196 parts of 0.1 percent phenothiazine in toluene solution, 1.6 parts hydroquinone, 32 parts butylstannoic acid and 880 parts toluene. Heating is applied over a period of about one hour and 15 minutes to raise the temperature of the reaction mixture to about 110° C., at which temperature refluxing begins. Refluxing is continued for nine hours while the temperature of the reaction mixture gradually rises to 118° C., after which time 462 parts water is collected and an acid value of 38 is obtained for the reaction mixture (measured as milliequivalents of titrated KOH per gram of sample). The reaction product is then cooled to about 52° C., and discharged into a storage container.

Then 4600 parts of the reaction product is placed in a reaction vessel equipped with heating means, cooling means, a thermometer and a vacuum distillation apparatus. With the contents of the vessel at an initial temperature of about 37° C., a vacuum is established in the vessel measured as 37 millimeters mercury absolute pressure. Heating is applied over a period of one hour and 40 minutes, after which time the temperature rises to about 77° C., the vacuum is measured as 38 millimeters mercury absolute pressure, and 890 parts distillate, comprising mainly toluene, is collected. The reaction product is held under these conditions for an additional one hour and 20 minutes, after which time the vacuum is measured as 20 millimeters of mercury absolute pressure, the temperature is about 79° C. and a cumulative total of 947 parts distillate is collected. The reaction product is then cooled to about 52° C. and filtered through a 10 micron GAF filter bag into a storage container.

EXAMPLE VII

A reaction vessel is equipped with an agitator, a heater, cooling means, a thermometer and a condensing apparatus designed for refluxing an azeotropic mixture, commonly known as a Dean-Stark trap. The vessel is charged with 544 parts of an intermediate reaction product prepared by the reaction of equimolar amounts of formic acid and diethanolamine, as generally set forth in Example VI, together with 233 parts 1,1,1-trimethylolpropane, 785 parts glacial acrylic acid, 86 parts of a 0.1 percent solution of phenothiazine in toluene, 14 parts butylstannoic acid, 0.7 part hydroquinone and 386 parts toluene. The Dean-Stark trap is filled with toluene to aid in separation of the water component from the water-toluene azeotrope. With the apparatus set for maximum agitation and maximum azeotropic reflux, the reaction mixture is heated to about 107° C. in 20 minutes and then to about 110° C. in a subsequent one-hour heating period. Water of reaction, separated from the volatile azeotrope and collected in the Dean-Stark trap, amounts to about 32 parts after the initial one hour and 20 minute heating period. The reaction mixture is then heated for 8 hours and 30 minutes at 110°-121° C., with care being taken that the temperature of the reaction mixture does not exceed 127° C. At the end of the heating period, approximately 168 parts water is collected from the reaction vessel. The reaction mixture is then cooled to 49°-52° C. and filtered through a nylon bag into a storage container.

An airtight reaction vessel equipped with an agitator, a heater, cooling means, a thermometer and vacuum distillation apparatus is charged with about 181 parts of the reaction product from the aforementioned storage container. With application of a vacuum to the reaction vessel measured as 20-23 millimeters of mercury absolute pressure, the reaction product is heated to about 77° C. in two hours and 30 minutes. Approximately 34 parts of distillate, comprising mainly toluene, is collected during this initial heating period. The reaction product is then heated an additional hour at about 80° C. at 18 millimeters mercury absolute pressure. The amount of distillate collected remains at about 34 parts thus indicating removal of most of the volatile solvent from the reaction product. The product is then cooled to about 52° C. and filtered through a 10 micron GAF filter into a storage container.

EXAMPLE VIII

A reaction vessel is equipped with an agitator, a heater, cooling means, a thermometer and a condensing apparatus. The vessel is charged with 104 parts ε-caprolactone and then under a nitrogen blanket the charge is heated to about 52° C. over a period of 30 minutes. Then over a period of 50 minutes 95 parts of preheated diethanolamine is gradually added to the first charge, with care being taken during the exothermic reaction so that reaction mixture does not exceed 57° C. The temperature of the reaction mixture is then increased to 60°-63° C. and maintained at that temperature for about 2 hours and 40 minutes. Then 17 parts more ε-caprolactone is added to the reaction mixture, with gradual heating over a period of 1 hour to raise the temperature to 68°-71° C. The reaction mixture is held at 68°-71° C. for 4 hours after which time a base value of 18.2 is obtained (expressed as milliequivalents of back-titrated KOH per gram of sample). The amide triol intermediate product is then cooled to room temperature.

Into another reaction vessel equpped as before and having a Dean-Stark trap for removing water from an azeotropic mixture, there is introduced 109 parts of the aforementioned intermediate product together with 98 parts glacial acrylic acid, 2 parts butylstannoic acid, 0.013 part phenothiazine, 0.2 part hydroquinone and 39 parts toluene. The reaction mixture is then heated to about 114° C. in about 45 minutes at which time the apparatus is set for maximum agitation and maximum azeotropic reflux. For a period of approximately 10 hours, the reaction mixture is maintained at a temperature of 111°-126° C. during which time maximum reflux conditions are maintained. Approximately every hour during the reflux period, the acid value of the reaction mixture and the quantity of by-product water from the azeotropic distillation are measured. At the end of the reflux period, the acid value is 48.7 while approximately 19 parts water is collected. The reaction mixture is then cooled to about 52° C. before filtering through a 25 micron GAF filter into storage containers.

Approximately 227 parts of the unstripped resin-solvent mixture prepared above is placed in a vessel equipped with heating means and vacuum distillation apparatus. The mixture is heated while a vacuum is simultaneously established in the reaction vessel. The temperature is maintained at 77°–81° C. under vacuum conditions for about three and 3/4 hours, after which time approximately 29 parts of volatile distillate is collected.

EXAMPLE IX

A reaction vessel is equipped with an agitator, a heater, cooling means, a thermometer and a condensing apparatus. The vessel is charged with 164 parts isophorone diisocyanate, 200 parts triethyleneglycol diacrylate and 0.4 part dibutyltin dilaurate catalyst. With the apparatus set for maximum agitation, heat is applied to raise the temperature of the reaction mixture to about 40° C. Then over a period of about 2 hours, 296 parts of a polydimethylsiloxane sold by Dow Corning under the trade designation "Silicone Q4-3557" is added to the vessel, during which time any exothermic reaction occurring is controlled by maintaining the temperature at 40°–42° C. Thereafter the mixture is heated to about 49° C. over a period of 15 minutes, and then is held at 49° C. for about 30 minutes. An air sparge is applied to the reaction mixture while a nitrogen blanket is established above the reaction mixture surface. Then over a period of 30 minutes, a mixture of 138 parts 2-hydroxyethyl acrylate and 1.5 parts di-t-butyl-p-cresol ("Ionol" inhibiting agent; Shell Oil Co.) is added to the vessel. Thereafter the reaction mixture is held at 49°–52° C. for about 5 hours, after which time a viscosity measurement of an undiluted sample of the reaction mixture is found to be "J" on the Gardner-Holdt scale. Then heat is applied to raise the temperature of the reaction mixture to about 60° C., with the temperature thereafter being held at 64°–71° C. for about 4 hours. A viscosity measurement is obtained as "R+". The reaction mixture is then cooled to about 49° C. and filtered through double layer nylon bags into a storage container.

EXAMPLE X

A coating composition is formulated from 43 parts of a siloxane urethane acrylate prepared as generally set forth in Example I, 7 parts 2-ethylhexylacrylate and 1 part diethoxyacetophenone. The composition is applied to a vinyl asbestos floor tile with a 0.042 wire-wound drawdown bar to a coating thickness of about 2.5 mil. The tile is subjected to ultraviolet radiation from four 200 watt per inch mercury vapor lamps at a distance of about 3½ inches from a conveyor carrying the tile at a speed of 74 feet per minute. The cured film on the tile is observed to be very hard and slippery and to have good adhesion and stain resistance.

EXAMPLE XI

Into a reaction vessel equipped with a thermometer, an agitator and heating means, there are charged 108 parts poly(2-ethylhexylacrylate) ("Modaflow" flow agent; Rohm & Haas Co.), 538 parts $\alpha,\alpha$-dimethoxy-$\alpha$-phenyl acetophenone ("Irgacure 651"; Ciba-Geigy), 246 parts benzophenone, 65 parts spermaceti wax and 943 parts isopropyl alcohol. The contents of the vessel are mixed and heated sufficiently to form a homogeneous "pre-mix" solution.

Into two additional reaction vessels designated vessels "A" and "B" and equipped as before, there is charged into each vessel 1161 parts of amide acrylate reaction product prepared according to the procedures set forth in Example VI, together with 1161 parts of amide acrylate reaction product prepared as in Example VII, 995 parts of the amide acrylate reaction product prepared as in Example VIII, 86 parts of the siloxane urethane acrylate reaction product prepared as in Example IX and 597 parts of the above prepared pre-mix solution. To vessel "A" only there is added 23 parts methyl phenylglyoxylate.

The viscosity of composition "A" is measured as 360 cps., while that of composition "B" is 380 cps., for samples tested at 25° C. with a No. 3 spindle at 12 rpm on a Brookfield LVF viscometer.

For a satisfactory cure-rate determination, samples of each composition are applied to the non-coated sections of #016 Morest paint penetration-opacity paperboard panels with a #003 wire-bound draw down bar. Samples are also applied to commercially available clay-coated paperboard used in the paper coating industry for evaluation of cured-coating physicals. The coated panels are exposed to a single 200 watt per inch mercury vapor lamp at a distance of 3½ inches above a conveyor carrying the panels at varying conveyor speeds.

Pertinent data relating to cure rates and physical characteristics are listed in Table I.

TABLE I

| Sample | | Conveyor Speed* | Fingernail Mar | Gloss (at 60° | |
|---|---|---|---|---|---|
| Example # | Panel # | (ft./min.) | Resistance | Inclination | Flexibility |
| XI-A | 1 | 290 | Mars | — | — |
| | 2 | 280 | Very slight mar | — | — |
| | 3 | 270 | Mar-free | 88–91 | Excellent |
| XI-B | 1 | 270 | Mars | — | — |
| | 2 | 260 | Slight mar | — | — |
| | 3 | 250 | Very slight mar | — | — |
| | 4 | 240 | Mar-free to very slight mar | 88–91 | Excellent |

Although specific examples of the instant invention have been set forth hereinabove, it is not intended that the invention be limited solely thereto, but is to include all the variations and modifications falling within the scope of the appended claims.

What is claimed is:

1. Radiation polymerizable compound comprising the reaction product of:
   (A) at least one siloxy-containing polycarbinol compound;
   (B) a polyisocyanate; and
   (C) a polyfunctional compound having at least one functional group which is reactive with an isocyanato group of said polyisocyanate and which polyfunctional compound after reaction with said isocyanato group provides at least one ethylenic functional group in said reaction product.

2. The radiation polymerizable compound of claim 1 wherein said siloxy-containing polycarbinol is a compound of the formula

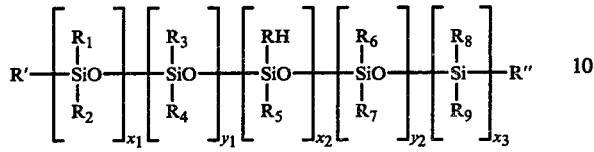

where
$R' = R_1 = R_2 = R_3 = R_4 = R_5 = R_8 = R_9 = R''$
$= -CH_3$
$x_1 = x_3 = 1$
$x_2 = 3$
$y_1$ has an average value of 74.1
$y_2 = 0$

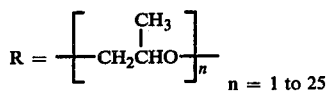

3. The radiation polymerizable compound of claim 1 wherein said siloxy-containing polycarbinol is a compound of the formula

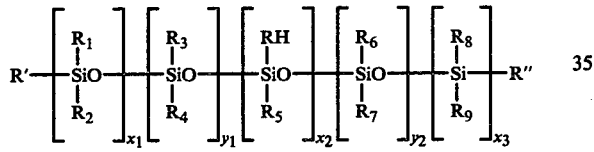

where
$R' = R_1 = R_2 = R_3 = R_4 = R_5 = R_8 = R_9 = R''$
$= -CH_3$
$x_1 = x_3 = 1$
$x_2 = 3$
$y_1$ has an average value of 26.2
$y_2 = 0$
$R = -(CH_2CH_2O)_n$
$n = 1$ to 25.

4. The radiation polymerizable compound of claim 1 wherein said siloxy-containing polycarbinol is a compound of the formula

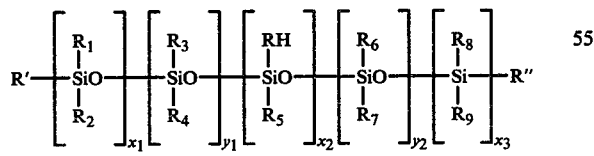

where
$R' = R_1 = R_2 = R_3 = R_4 = R_5 = R_8 = R_9 = R''$
$= -CH_3$
$x_1 = x_3 = 1$
$x_2 = 2$
$y_1$ has an average value of 5.6
$y_2 = 0$

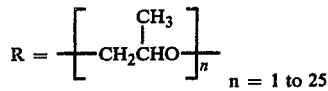

5. The radiation polymerizable compound of claim 1 wherein said siloxy-containing polycarbinol is a compound of the formula

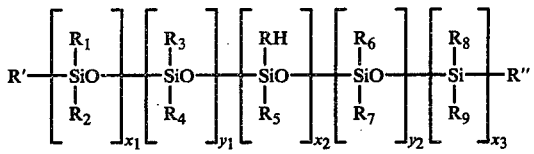

where
$R' = R'' = RH$, with $R = -(CH_2CH_2O)_n$
$n = 1$ to 25
$R_1 = R_2 = R_3 = R_4 = R_8 = R_9 = -CH_3$
$x_2 = 0$
$x_1 = x_3 = 1$
$y_1$ has an average value of 29.4
$y_2 = 0$.

6. The reaction product of claim 1 wherein said polyisocyanate is selected from the group consisting of toluene diisocyanate and 1-isocyanatomethyl-5-isocyanato-1,3,3-trimethylcyclohexane.

7. The reaction product of claim 1 wherein said polyfunctional compound is acrylic acid or a hydroxyl-containing acrylic ester.

8. The reaction product of claim 7 wherein said hydroxyl-containing acrylic ester is selected from the group consisting of 2-hydroxyethyl acrylate, 2-hydroxypropyl acrylate, 2-hydroxyethyl methacrylate and 2-hydroxypropyl methacrylate.

9. A method for preparing a radiation polymerizable compound comprising reacting
(A) at least one siloxy-containing polycarbinol compound;
(B) a polyisocyanate; and
(C) a polyfunctional compound having at least one functional group which is reactive with an isocyanato group of said polyisocyanate and which polyfunctional compound after reaction with said isocyanato group provides at least one ethylenic functional group in said reaction product.

10. The method of claim 9 comprising
(1) reacting said siloxy-containing polycarbinol compound with said polyisocyanate to form an intermediate having at least one terminal isocyanato group; and
(2) reacting said intermediate with said polyfunctional compound.

11. The method of claim 9 comprising
(1) reacting said polyisocyanate with said polyfunctional compound to form an intermediate having at least one terminal isocyanato group; and
(2) reacting said intermediate with said siloxy-containing polycarbinol compound.

12. The method of claim 9 comprising
(1) forming a mixture of said siloxy-containing polycarbinol compound and said polyfunctional compound; and
(2) adding said polyisocyanate to said mixture.

13. The method of claim 12 wherein said polyisocyanate is added gradually to said mixture of polycarbinol and polyfunctional compounds.

14. A coating composition comprising radiation polymerizable compound as defined in claim 1.

Dedication

4,130,708.—*Charles B. Friedlander,* Glenshaw and *John C. McMullen,* Pittsburgh, Pa. SILOXANE URETHANE ACRYLATE RADIATION CURABLE COMPOUNDS FOR USE IN COATING COMPOSITIONS. Patent dated Dec. 19, 1978. Dedication filed Mar. 6, 1986, by the assignee, *PPG Industries, Inc.*

Hereby dedicates to the Public the remaining term of said patent.
[*Official Gazette May 13, 1986.*]